United States Patent [19]

Pelizzari et al.

[11] Patent Number: 4,977,505

[45] Date of Patent: Dec. 11, 1990

[54] MEANS TO CORRELATE IMAGES FROM SCANS TAKEN AT DIFFERENT TIMES INCLUDING MEANS TO DETERMINE THE MINIMUM DISTANCES BETWEEN A PATIENT ANATOMICAL CONTOUR AND A CORRELATING SURFACE

[75] Inventors: Charles A. Pelizzari, Western Springs; George T. Y. Chen, Winnetka, both of Ill.

[73] Assignees: Arch Development Corporation; The University of Chicago, both of Chicago, Ill.

[21] Appl. No.: 198,043

[22] Filed: May 24, 1988

[51] Int. Cl.$^5$ .............................................. G06F 15/42
[52] U.S. Cl. ........................... 364/413.19; 364/413.13
[58] Field of Search ...................... 364/413.19, 413.13, 364/413.14, 413.15

[56] References Cited

PUBLICATIONS

"Structure Transfer Between Sets of Three Dimensional Medical Imaging Data", Chen et al., Proceedings of the National Computer Graphics Association Annular Meeting vol. III, pp. 171-177 (1985).
"Image Correlation", Chen et al., Radiation Oncology Physics 1986, Editor-Keriakes et al., American Inst. Physics, 1987, pp. 595-608.
"Logarithmic Solution to the Line-Polygon Intersection Problem: Application to Radiotherapy Dose Calculations", Siddon et al., Barth, The Use of Computers in Radiation Therapy, Brunvis et al. (editors) 1987, pp. 467-470.
"Prism Representation: A 3D Ray-Tracing Algorithm for Radiotherapy Applications", Siddon, Phys. Med. Biol., 1985, vol. 30, No. 8, pp. 817-824.
"Image Correlaton", Chen et al., Presented at 7th Course: Advances in Medical Imaging and Related Dosimetry, Erice, Italy, 5-15 Jul. 1986.
"Techniques and Applications of Image Correlation in Radiotherapy Treatment Planning", Kessler et al., Front. Radiat. Ther. Onc., vol. 21, pp. 25-32 (Karger, Basel 1987).
"Selected Advances in Radiotherapy Treatment Planning", Chen et al, Proceedings of Eleventh Variant Users Meeting, pp. 46-52.
"Charged Particle Treatment Planning", Chen et al, Proceedings of 72nd Annual Meeting of the Radiological Society of North Americal, (1986).
"Three Dimensional Correlation of PET, CT and MR Images", Pelizzari et al., Presented at Society of Nuclear Medicine, 34th Annual Meetinhg, Toronto, 2-5 Jun. 1987.
"Registration of Multiple Diagnostic Imaging Scans Using Surface Fitting", Pelizzari et al., Use of Computers in Radiation Therapy, Brunvis et al. (Editors), Elsevier Publishers, 1987, pp. 437-440.
"Image Analysis of PET Data with the Aid of CT and MR Images" Chen et al., Information Processing in Medical Imaging, de Graaf et al., (editors), Plenum Press, 1988 (pp. 601-611).

Primary Examiner—Michael R. Fleming
Assistant Examiner—Gail O. Hayes
Attorney, Agent, or Firm—Perman & Green

[57] ABSTRACT

Herein is described a method for creating composite images from disparate sets of tomographic images. The images may be derived from CAT, MRI or PET systems. Initially, a "head" is created from one set of tomographic image slices. The head comprises a three dimensional stack of contours created from such slices. A "hat" is created from another set of tomographic image slices with the hat being described by a plurality of points with coordinate positions which define the three dimensional surface of stack of image slices. The hat is then superimposed over the head and subsequently, a determination is made by examination of side and top planar views of the hat and head, of a factor which defines the mean distance of the hat points from the head contours. The hat is subsequently adjusted relative to the head until the mean distance is found to be within minimum limits.

8 Claims, 9 Drawing Sheets

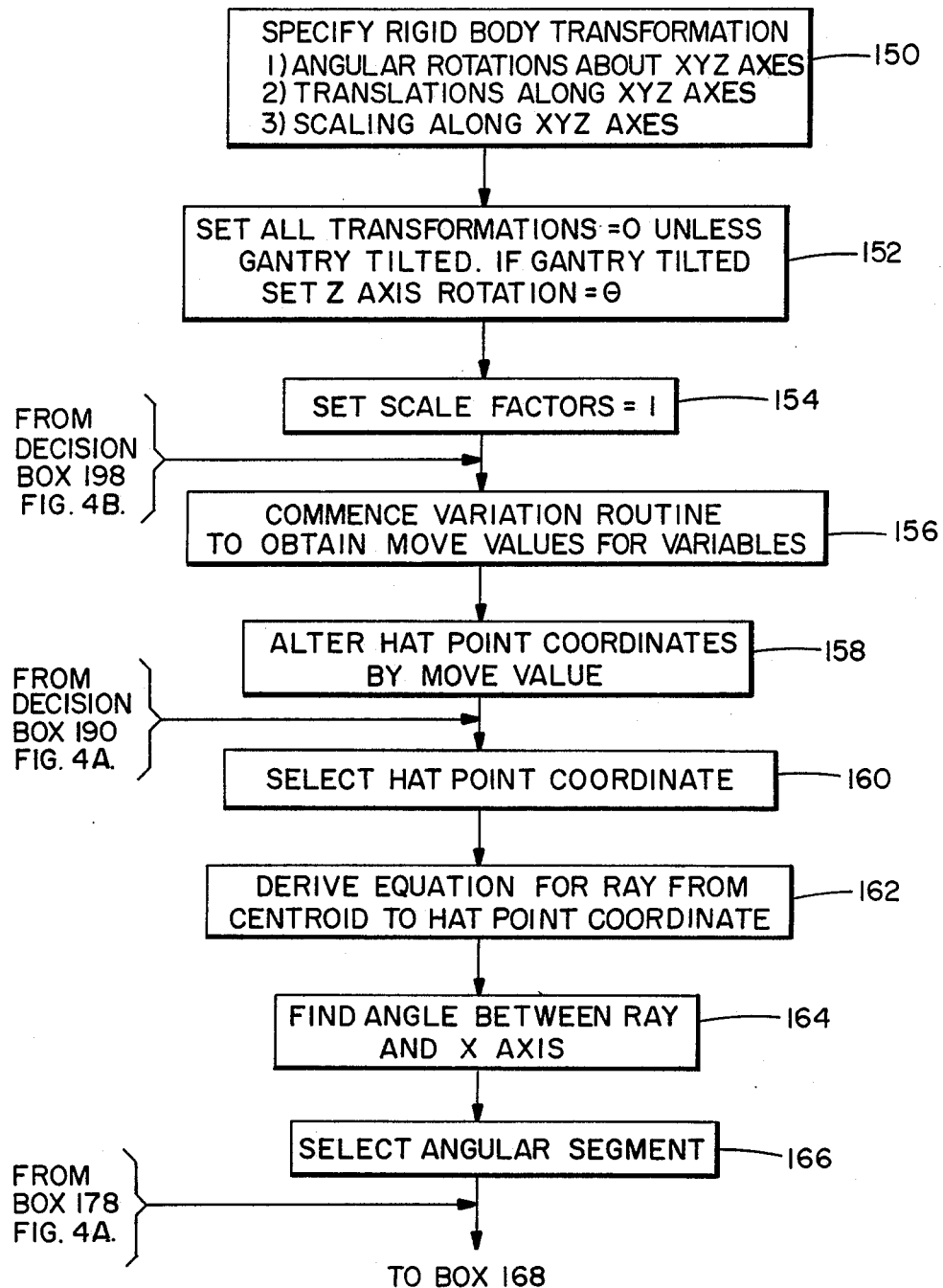

$$di^2 = (X-X_i)^2 + (Y-Y_i)^2 + (Z-Z_i)^2$$

$$F = \sum_{1}^{N} di^2$$

N = N⁰ OF HAT POINTS

MEANS TO CORRELATE IMAGES FROM SCANS TAKEN AT DIFFERENT TIMES INCLUDING MEANS TO DETERMINE THE MINIMUM DISTANCES BETWEEN A PATIENT ANATOMICAL CONTOUR AND A CORRELATING SURFACE

FIELD OF THE INVENTION

This invention relates to anatomical imaging and more particularly to a method for producing a composite image from a variety of tomographic images.

BACKGROUND OF THE INVENTION

Images from computer automated tomography (CAT), magnetic resonance imaging (MRI) and positron emission tomography (PET) contain complementary anatomic and physiological information useful in neurologic research, diagnosis and treatment. CAT and MRI scans are particularly good at showing various anatomic details whereas a PET scan indicates the physiological function of tissue, whether healthy or not. The need frequently arises to accurately correlate information from different imaging modalities or to quantitatively access changes in scans made at different times.

Under most clinical conditions, imaging studies are performed without rigorous attention to reproducible patient positioning. Even when great care is taken, differences in scanner characteristics (pixel size, slice thickness and spacing, image distortion ) and subtle variations in patient positioning prevent correlation of features observed in separate scans where 3D accuracies in the millimeter range are desired. For many clinical applications, such as planning and evaluation of radiation therapy or radio surgery, correlations at the 5-10 millimeter level of accuracy are not of sufficient value to justify the effort required to obtain them. Lack of a practical method to reliably correlate functional images with patient specific anatomic data has also been recognized as a significant obstacle in the analysis of PET data.

In the prior art, image correlation has been accomplished by matching anatomical landmarks or external markers in subsequent scans, or by the use of stereotactic frames to establish a common coordinate system. Stereotactic methods have been reported which use specially designed frames visible in PET scans to allow correlation of functional images with patient-specific anatomic images and with normal anatomy from an atlas. (e.g. Chen et al, Computer Graphics 1985, Proceedings of the National Computer Graphics Association Annual Meeting, Dallas TX, 1985, pages 171-175; and Olivier et al, Review EEG Neurophysiol. Clin. Vol. 17, No. 25, (1987).

It is known that repeated precise application of external markers and frames is difficult to accomplish and sufficient numbers of internal anatomical landmarks are frequently not identifiable on all scans of interest. Methods using external markers or stereotactic frames are unsuited for retrospective investigations using data acquired in routine clinical practice.

The inventors herein have previously attempted to overcome some of the shortcomings in the prior art relating to the superimpostion of CAT, MRI and PET images. A fitting technique was developed which involved contouring the outer three dimensional limits of a skull series from various studies. The process used to describe the surface of the outer image was called "tiling" and it involved the connection of the various coordinate points by line segments to form "tiles" against which subsequent measurements were taken. The tiled surface was then represented as a "head" while points of the external contours of a second study were used to form a "hat" about the head. The problem then reduced to finding that transformation which allowed the hat to be fit on the head with the least amount of volume between the two surfaces.

The problem with the above technique was that the solution involved finding intersections between the surfaces and rays drawn therebetween to obtain the distances between the surfaces. This involved, to some extent, a blind search of all of the tiles to find the one through which the ray passed on the way to a "hat" point. In such a system, the processing time was proportional to the number of tiles and became quite long. This technique was reported in "Radiation Oncology Physics" (1986), published by the American Institute of Physics 1987 in an article entitled: "Image Correlation" by Chen, Pelizzari, Spelbring and Kessler, pages 595-608.

In order for an image correlation technique to be at all useful, the processing time to achieve the correlation must be brought to a minimum. The major time consuming portion of the algorithm is in the over and over distance determinations between the hat points and head contours to find the minimum volume. As above stated, a procedure involving ray tracing to tiles was found to be unsatisfactory as it involved a large number of three dimensional ray/tile interaction calculations which took a great deal of time.

Recently, certain studies have been published in an allied field (Radiotherapy) which indicate that a 3-D ray tracing problem can be accomplished by utilizing two dimensional representations. e.g. see "Prism Representation: A 3-D Ray-Tracing Algorithm for Radiotherapy Applications", by Siddon, Phys. Med. Biol. (1985) Vol 30, No. 8, pages 817-824; and "Logarithmic Solution to the Line-Polygon Intersection Problem: Application to Radio Therapy Dose Calculations," by Siddon et al published in *The Use of Computers in Radiation Therapy*, Elsevier Science Publishers B.V. (North-Holland), 1987, pages 467-470. Siddon, in both of the aforementioned articles speaks of a method for ray tracing to find an internal distance within the skull to a site to be treated with a radiotherapeutic modality. By using two dimensional representations of the skull, Siddon is able to substantially reduce the amount of calculations required to find the internal distance to a treatment site.

Accordingly, it is an object of this invention to provide an improved method for providing composite images of tomographic studies, which method utilizes improved processing techniques.

It is a further object of this invention to provide an improved method for creating composite images of tomographic studies wherein the processing time to produce such composite images is minimized.

SUMMARY OF THE INVENTION

The invention embodies a method for creating composite images from disparate sets of tomographic images. The images may be derived from CAT, MRI or PET systems. Initially, a "head" is created from one set of tomographic image slices. The head comprises a three dimensional stack of contours created from such slices. A "hat" is created from another set of tomographic image slices with the hat being described by a plurality of points with coordinate positions which define the three dimensional surface of the stack of image slices. The hat is then superimposed over the head and subsequently, a determination is made by examination of side and top planar views of the hat and head, of a factor which defines the mean distance of the hat points from the head contours. The hat is subsequently adjusted relative to the head until the mean distance is found to be within minimum limits.

DESCRIPTION OF THE DRAWINGS

FIGS. 1A, 1B, 2A, 2B, 3A, 3B, 4A and 4B are flow diagrams which illustrate the algorithms employed by the invention;

DETAILED DESCRIPTION OF THE INVENTION

Figure 1A:
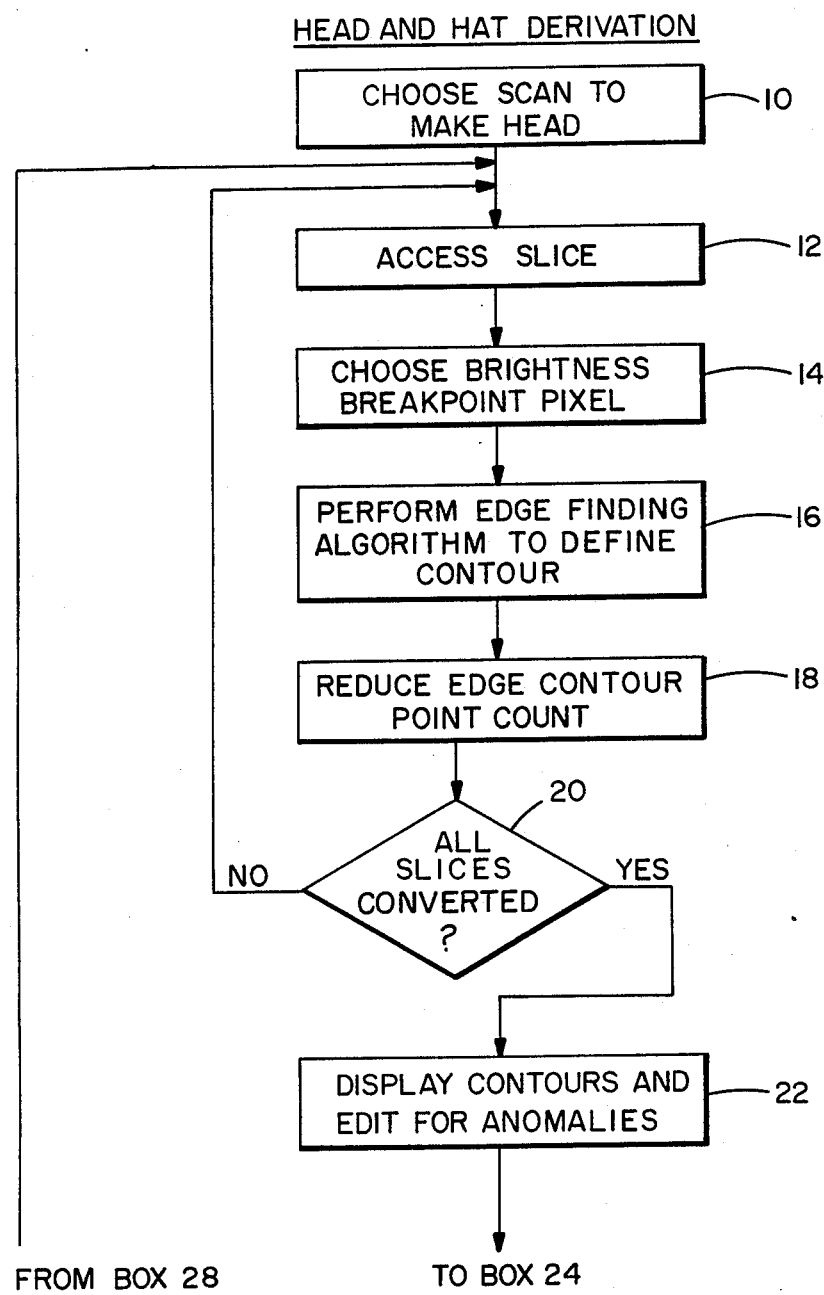
Figure 1B:
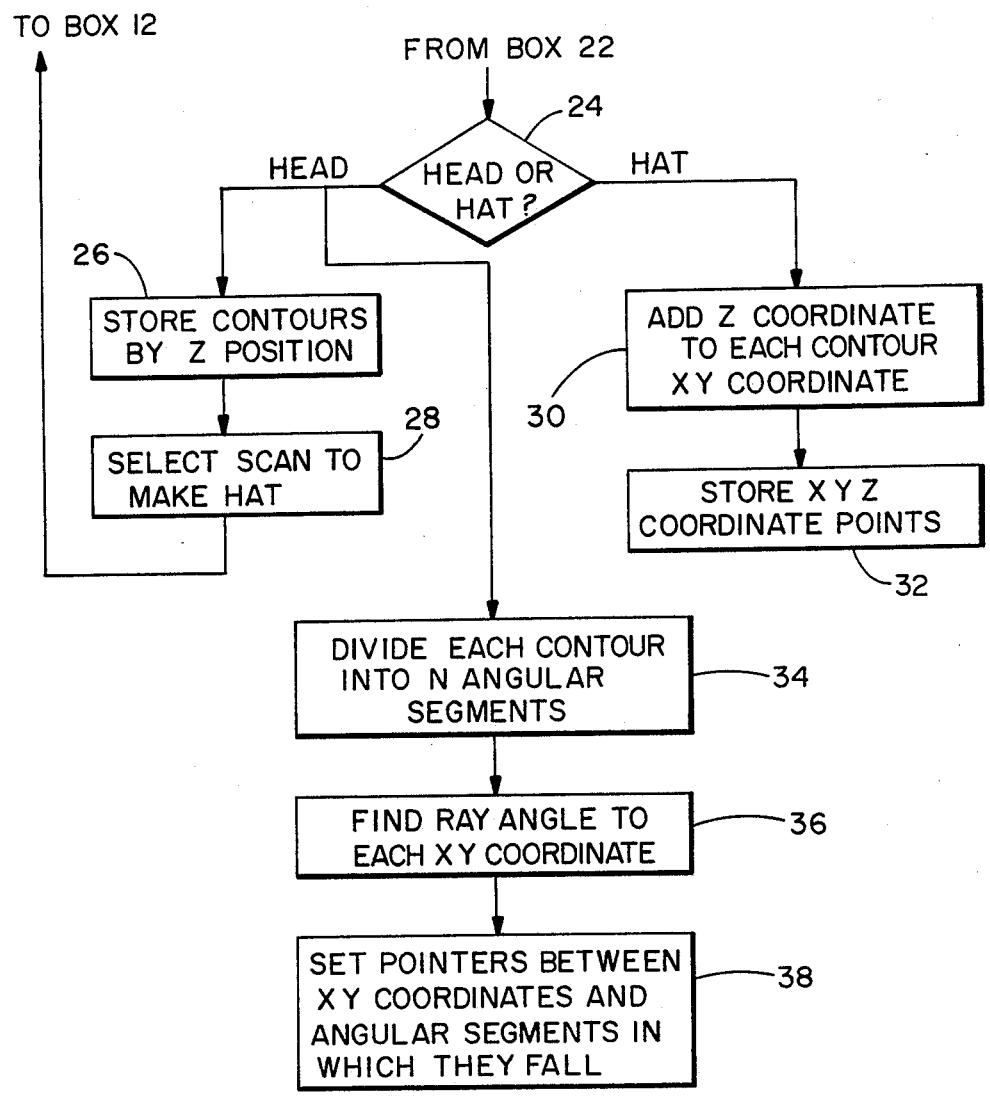

Initially, it is assumed that a patient has undergone a variety of diagnostic radiologic modalities. For instance, over a period of time a patient may have had one or more CAT scans, one or more PET scans or MRI cans. In order for the physician to determine the precise differences between subsequent scans or to add information gleaned from one scan into another, it is necessary for the physician (or display system operator) to superimpose the data from the various scans over each other. It is of course assumed that the user has access to a display terminal which is adapted to present three dimensional images and to handle the calculations attendant thereto.

A three dimensional model of the surfaces from one scan is produced by outlining contours of the serial slices achieved during the scan. The scan covering the largest amount of the patient's anatomy is normally used for this purpose. The user then identifies the specific surfaces to be matched between scans. In operations involving examination of the skull, it is preferred to use, as the surfaces to be matched, the skull with its tissue as this is the feature which is best identified in most of the scans. Other choices include the bare skull, the inner surface of the skull or the surface of the brain. The use of bone surfaces for registration creates a problem when MRI scans are being examined as bones give a poor return with fuzzy images.

It has been found with PET scans, that the outside surface of the skull with tissue is well imaged when PET transmission techniques are used. Normally PET transmission is employed only to calibrate the PET system (in terms of attenuation to be experienced through the patient's skull). For each PET slice (a normal PET tomographic display) a corresponding transmission slice is generated which is used to account for photon attenuation effects during the reconstruction of the emission images. A PET transmission test involves the placement of a ring about the patient's head with subsequent measurements being made of the attenuation between a radioactive source on one side of the ring and a sensor on the other side. By taking a number of such readings, the boundary line may be generated which identifies the skin's surface and forms a good basis for a subsequent boundary model.

As is well known, each set of tomographic scans involves a stack of "slices" each of which has a cross section determined by the patient's skin/skull outline with a thickness in the vertical dimension determined by the system's characteristics. Referring now to FIGS. 1A–4B, the method for three dimensional model construction will be described. As above stated, the diagnostic scan covering the largest volume of the patient is selected to make the head model (box 10). The program then accesses a tomographic slice from the patient study (box 12). Assuming the specific surface to be matched is the skull with tissue in place, the outermost point where the pixel value traverses from black to white is chosen as the breakpoint (box 14). An edge finding algorithm is then employed and starts with the breakpoint pixel to define the external contours of the slice. Any suitable edge finding algorithm is acceptable and there are a number in the prior art. In essence, the algorithm, knowing the preexisting brightness of the edge point, searches in one direction around the periphery of the scene to find other edge points having similar boundary conditions to the break point pixel (box 16). The results of the edge finding algorithm is a series of X, Y coordinate points which define the external contour of the chosen tomographic slice.

Typically, for a slice image comprised of 256 by 256 pixels, a contour may have 1000 contiguous pixels per slice. Since a study may involve thirty or more slices, it can readily be understood that the number of pixel points increases rapidly until the problem becomes unmanageable. It has been found that the elimination of between 75% to 90% of the points still enables good results to be obtained with this invention. The major effect of the reduction in number of coordinate points occurs where there are regions of high curvature. There, some flattening is found as a result of the point contraction. Thus, for example as shown at box 18, four out of five of the contour points are discarded with every fifth point being retained.

The above described decision procedure is repeated for each tomographic slice (box 20) and when all contours have been derived, they are displayed (box 22) so that they may be edited for any anomalies which occurred during the processing. For instance, the edge finding algorithm may have not properly found the contour in complex areas (e.g. around the eyes/nose area of the skull) and these may need to be corrected by the operator.

The program then queries whether the head or hat is being operated upon and a program branch occurs depending upon the finding in decision box 24. Assuming that the head is being processed, the contours already derived and edited are stored as slices, indexed by their Z axis position (box 28). The program continues (box 28) by repeating the process to create the hat's coordinate points. To accomplish this, the program cycles back to access a slice of the scan chosen to make the hat and continues as aforesaid. When the process again returns to decision box 24 and finds that it is the hat which has been derived, the data is stored in a somewhat different manner. As shown in box 30, each contour point for the hat has added to it the Z coordinate associated with the point and then all of the points, as so modified, are stored as a "cloud" of points in a serial store (box 32).

Returning for a moment to the head derivation, as will become hereinafter apparent, it will become important to determine the distance between the head contours and the hat points so as to insure the proper orientation of the hat on the head. This will be accomplished by drawing a series of rays between the centroid of the head and each of the hat points. In that determination, it is important to know where those rays intersect with the various contours of the head. To enable that analysis to be performed efficiently, each of the head contours is divided into a number of n angular segments (box 34). Subsequently, each contour coordinate point has its angle in the X Y plane determined from the center point of the contour (box 36) and pointers are set between each coordinate and the angular segment in which it falls (and vice-versa). The usefulness of this file of pointers will become apparent subsequently.

Figure 6:
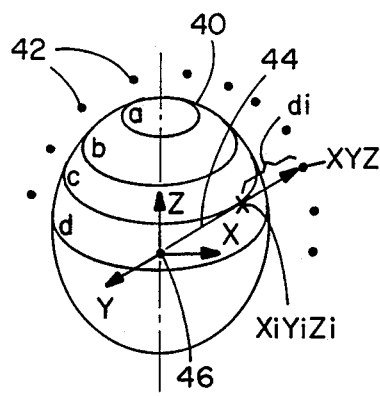
FIG. 6 is a three dimensional schematic view indicating a "head" around which hat points have been emplaced.

Turning now to FIG. 6, a schematic drawing of a head with hat points superimposed thereover is shown. Head 40 is shown as being comprised of four contours, i.e., a, b, c, and d. The hat, which is comprised of a number of points 42 (only a few of which are shown) has been superimposed over head 40. Each hat point 42 is defined by a set of cartesian coordinates X, Y and Z. The distance between each hat coordinate and the external surface of head 40 is defined as "$d_i$". A ray 44 is constructed and begins at centroid 46 of head 40. Centroid 46 is found by adding all of the X coordinates and dividing by the number thereof; Y coordinates and dividing by the number thereof and Z coordinates and dividing by the number thereof. This provides a composite X Y Z coordinate which is the three dimensional centroid of the head.

The point of intersection between ray 44 and the external surface of head 40 is given by the coordinate point XiYiZi. It can be seen that the distance $d_i$ can be determined by the following equation:

$$di^2 = (X - Xi)^2 + (Y - Yi)^2 + (Z - Zi)^2 \qquad (1)$$

Given equation (1), the function which the program then seeks to determine is as stated in equation (2) below:

$$F = \sum_1^N di^2 \qquad (2)$$

where N = No. of Hat points.

Figure 2A:
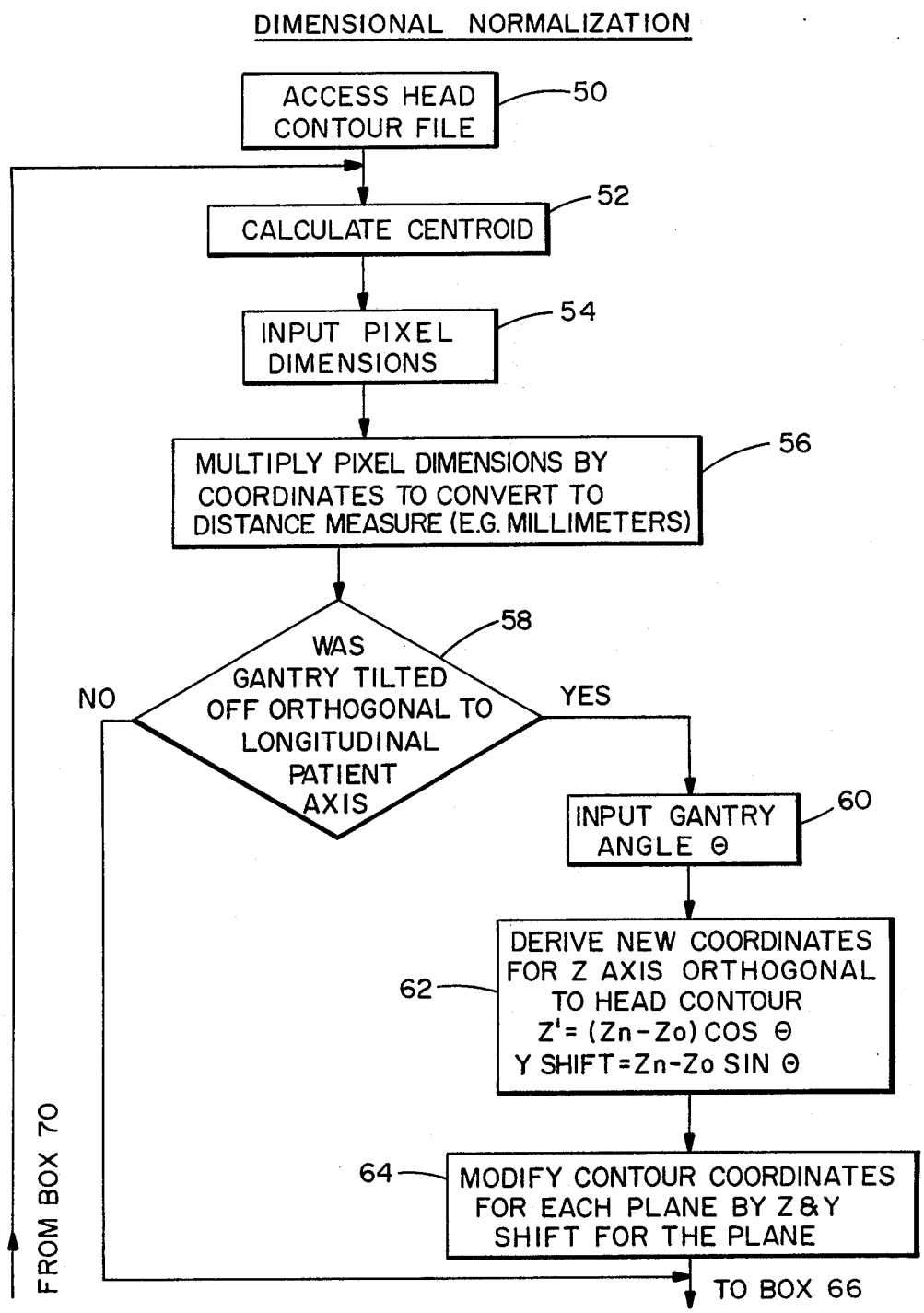
Figure 2B:
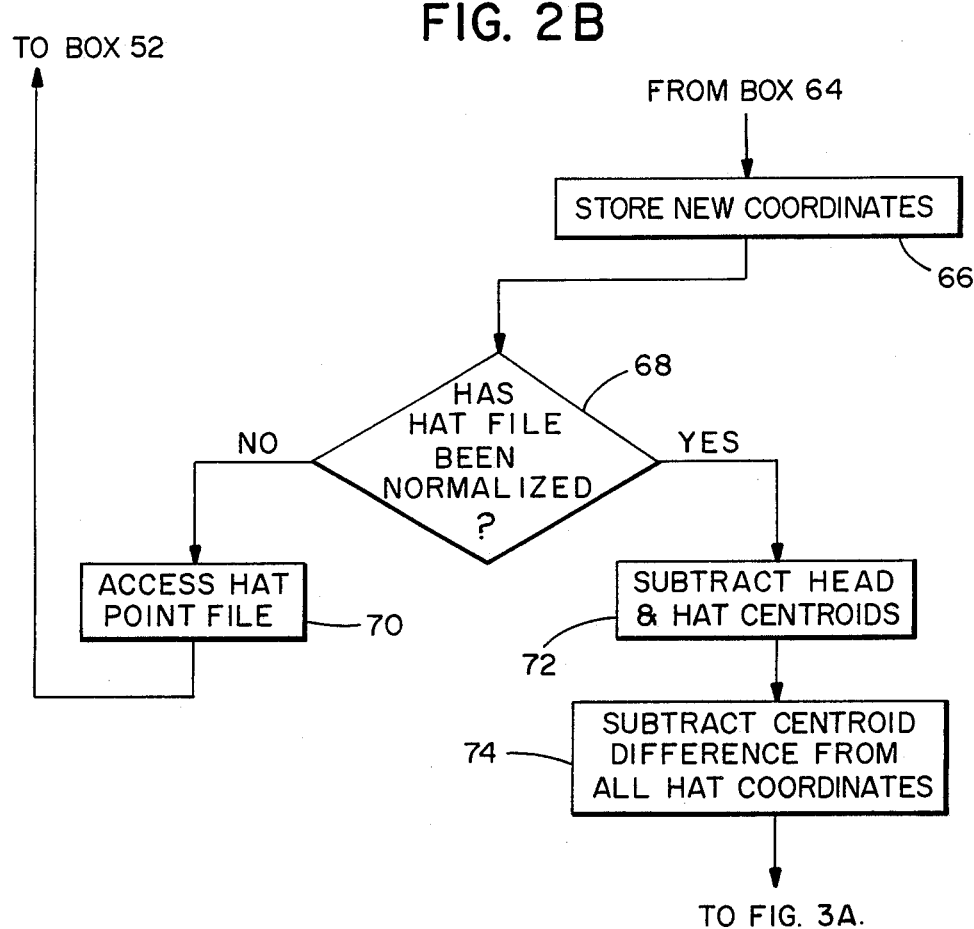
Figure 3B:
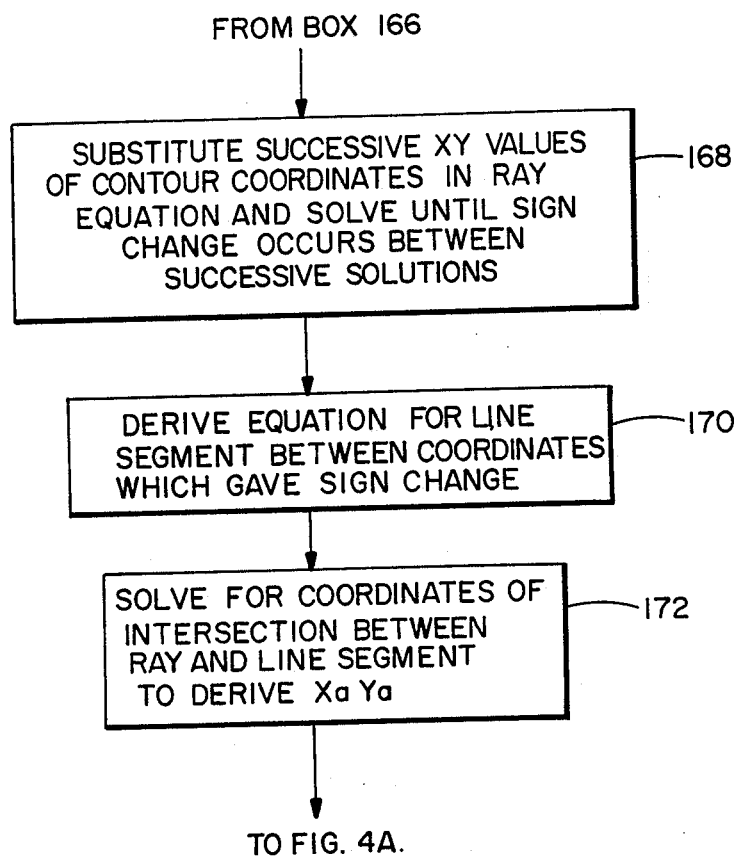
Figure 4A:
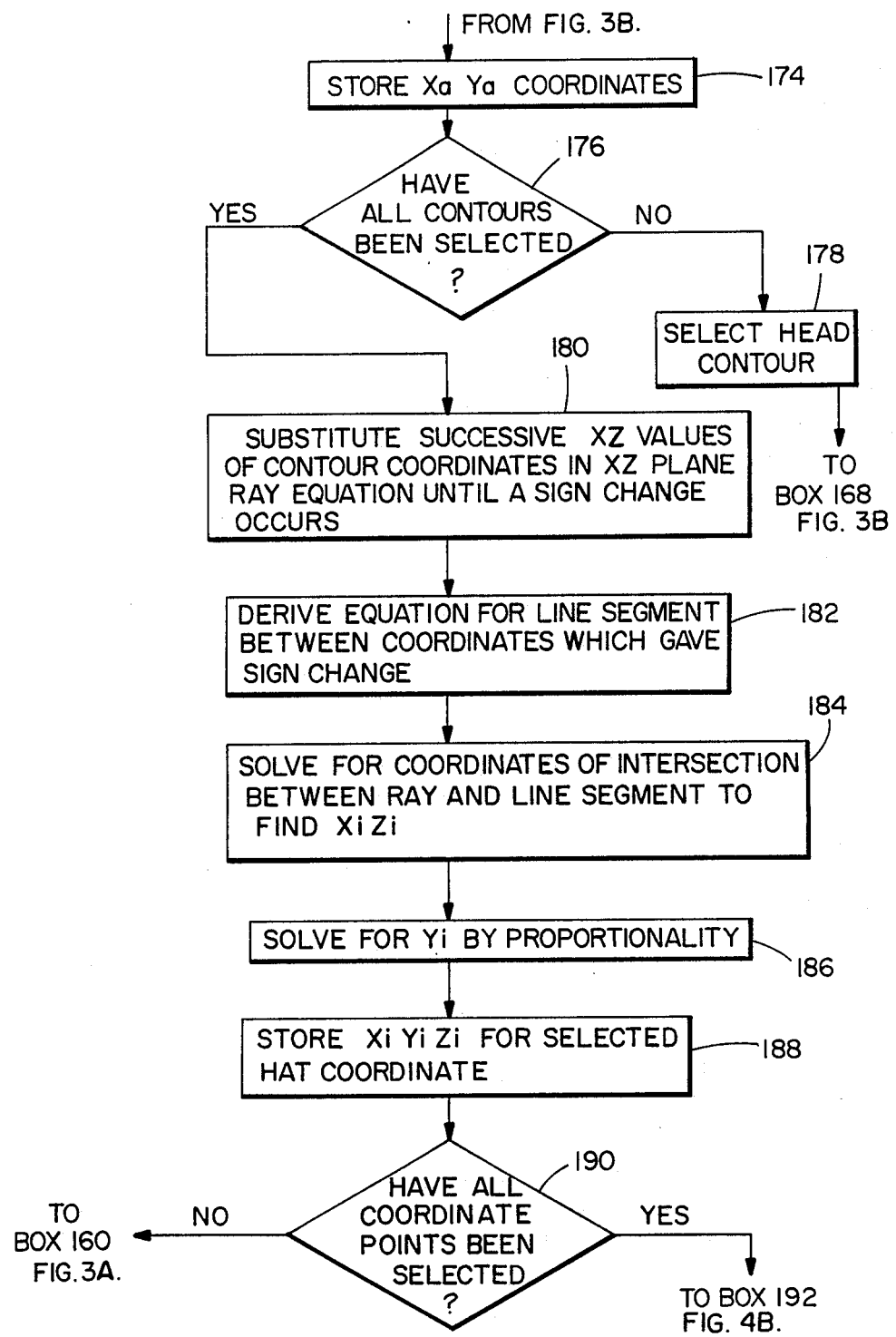
Figure 4B:
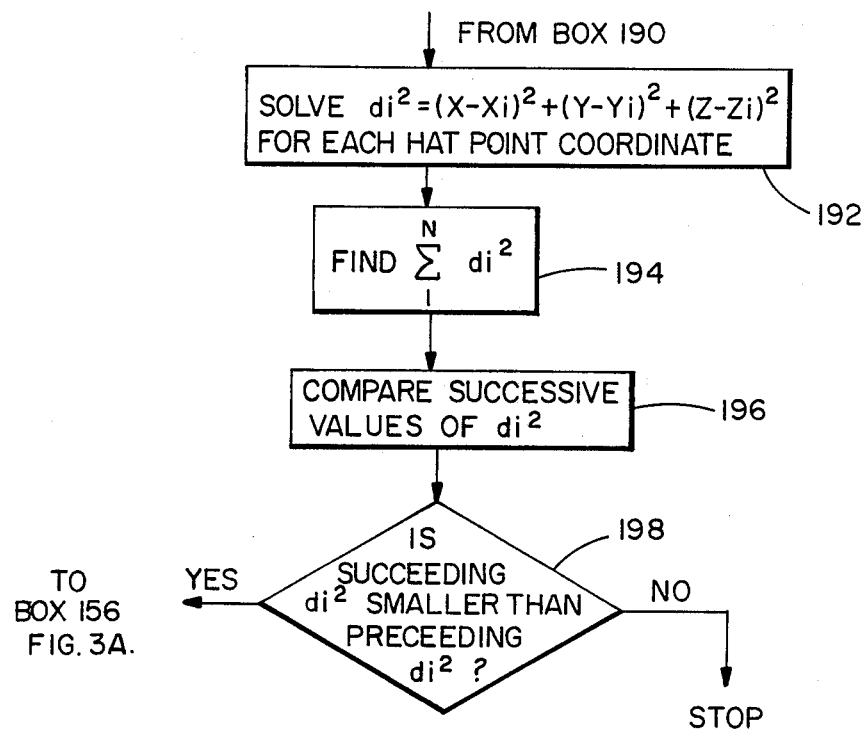
Figure 5:
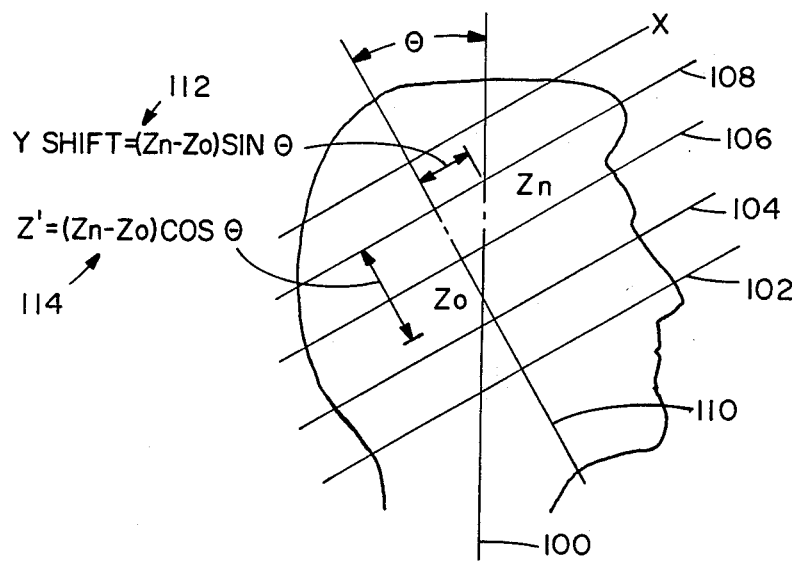
FIG. 5 is a schematic view indicating how gantry angle offset is corrected.

Turning to FIG. 2A, the head contour file is accessed (box 50) and the centroid for the head is calculated (box 52). The pixel dimensions for the scan from which the head contours were derived is then input (Box 54) and each of the X Y contour point coordinates is converted to a distance measure (box 56). For instance, in lieu of a contour coordinate being given by a set of X Y and Z numbers, those numbers are converted to a set of millimeter dimensions so that the X dimension indicates the millimeter distance along the X access to the particular coordinate point, etc. What occurs here is that the individual scan dimensions are converted into "world" dimensions so as to enable succeeding scans to be combined Next, as shown in decision box 58, it is determined whether the gantry was tilted from an orthogonal orientation with respect to the patient's longitudinal axis. Such a case is shown in FIG. 5, where Z axis 100 indicates the direction of traversal of the gantry as it creates multiple slices 102, 104, 106, 108 etc. It can be seen that the gantry was tilted at an angle $\theta$ to create the slices as shown. When gantry tilt is found, it is necessary to modify the origin point of each of the slices 102, 104, 106, 108 etc. so as to create a Z axis which is orthogonal to the each contour rather than at some angle $\theta$ with respect thereto. In this case, each contour coordinate point must be modified so that its measurements reflect the proper distance from new Z axis 110 rather than from old Z axis 100. It can be seen that the amount of Y shift applied to each contour coordinate is given by equation 112 in FIG. 6. Similarly, each Z shift is given by equation 114. This transformation is shown as being accomplished by the program at boxes 60, 62 and 64 in FIG. 2A.

The newly derived head contour coordinates are then stored (either after transformation or as they existed prior to transformation if there was no gantry tilt) (box 66). The program then proceeds to determine whether the hat file has been normalized (decision box 68) and if not, it proceeds by accessing the hat point file (box 70) and recircuiting the normalization procedure. Once both the hat and head files have been normalized, the centroids thereof are subtracted from each other and the resulting difference is subtracted from each of the hat coordinates. This assures that all hat coordinates have the same zero point as all head coordinates. (boxes 72 and 74).

At this point, the program (FIG. 3A) commences a routine to create the best fit between the hat and head. In this portion of the program, certain rigid body transformations will be applied to all hat points. They are: angular rotations about the X Y and Z axes; linear translations along the respective X Y and Z axes; and changes in scale along the X Y and Z axes (box 150). It should be recalled that a rigid body transformation is one wherein the movement of one coordinate point about one of its axes causes the exact same movement to be imparted to all other points in an exactly analogous manner.

Subsequent to specifying the rigid body transformations, the program sets them all to zero unless the gantry was tilted, in which case the Z axis is rotated by the amount of the gantry tilt $\theta$ (box 152). Then, the scale factors along each of the X Y and Z axes are set to one and are only modified once the proper fit has been obtained between the hat and head coordinate points. Next, each of the hat points is subjected to a variation subroutine which translates each of the hat points (in accordance with a rigid body transformation) by a small amount. Subsequently, the mean distance of all of the hat points from the head is calculated and it is subsequently determined if a minimum mean distance function has been achieved One variation subroutine which may be used herein is as defined by M. J. D. Powell in "An Efficient Method for Finding the Minimum of a Function of Several Variables Without Calculating Derivatives". Computer Journal, Volume 7, 1964 pages 155 et seq.

Figure 7:
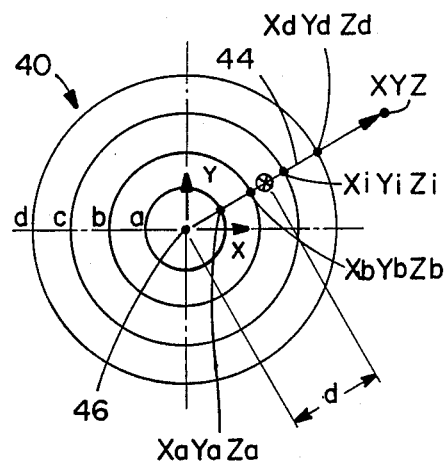
FIG. 7 is a top planar view of the head/hat arrangement which enables the points of intersection between head contours and a ray to be determined.
Figure 8:
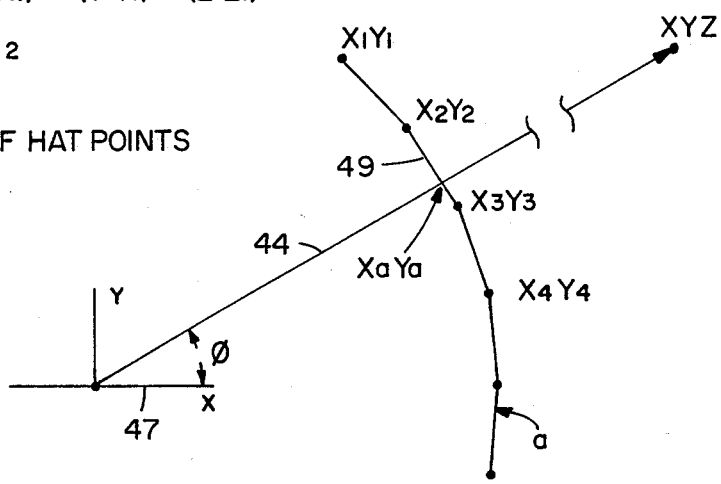
FIG. 8 is an expanded portion of FIG. 8 showing an intersection between a ray and a head contour.

As shown at boxes 156 and 158, each hat coordinate point is moved by the predetermined amount derived from the variation subroutine. Then, one hat coordinate point is selected (box 160) and a ray is "drawn" from the head centroid to the selected hat coordinate point (box 162). This will be better understood by referring now to FIGS. 7, 8, and 9. In FIG. 7, a top planar view of head 40 is shown with each of contours a, b, c, & d represented therein. Ray 44 is shown plotted in the XY plane and connects centroid 46 to hat point coordinates X, Y, Z. FIG. 8 is an expanded portion from FIG. 7 which shows ray 44 as it intersects head contour a In FIG. 9, a partial planar view of head 40 taken along the XZ plane is illustrated with ray 44 being plotted therein.

Figure 9:
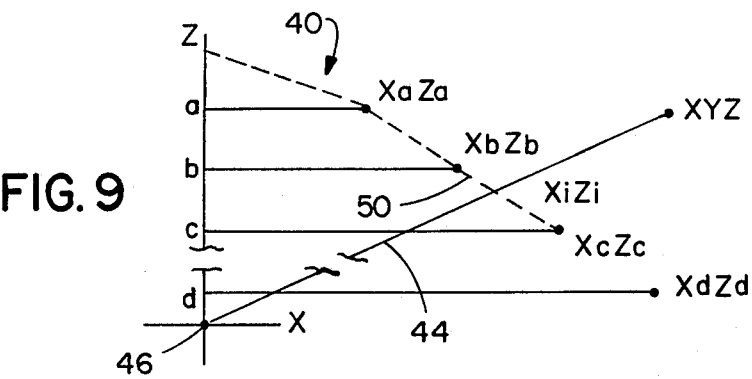
FIG. 9 is a side planar view of the head/hat which aids in calculating the point where a ray exits between head contours.

Returning now to FIGS. 3A and 3B in conjunction with FIGS. 7-9, the angle $\phi$ between ray 44 and X axis 47 (FIG. 8) is determined by straight-forward geometry (box 164) and the angular segment containing that angle $\phi$ is selected (box 166) along with its pointers to each of the head contour coordinate edges which overlap the angular segment. Assuming that the angular segment includes head contour coordinate points X1Y1-X4Y4 in contour a (FIG. 8), the program then finds the intersection of ray 44 with contour a. This is accomplished by substituting, in a clockwise (or counter-clockwise) manner the specific X and Y values of each contour coordinate into the equation for ray 44 and solving for the answer. It should be remembered that the equation for ray 44 in the XY plane is $aX+bY+C=0$. If it is assumed that the substitution of the values of a coordinate point to the left of ray 44 will result in a positive solution and the substitution of coordinate points to the right of ray 44 will result in a negative solution, then the two contour coordinates between which the ray equation solution changes sign identify the particular line segment through which the ray passes.

In the case shown in FIG. 8, the sign change occurs between contour coordinate points X2Y2 and X3Y3. To find the precise point of interception between ray 44 and the line segment 49 extending between those coordinate points, the equation for line segment 49 is derived (box 170) and the interception point XaYa is solved by setting both equations equal to each other and solving for the values of Xa and Ya (Box 172. The values of Xa and Ya are then stored (box 174 FIG. 4A) and the program continues to determine whether all additional contours have been selected and their points of interception with ray 44 determined. If not, the program selects a new head contour (Box 178), and repeats the process.

When all points of intersection between ray 44 and each of the head contours have been determined, it is necessary to determine between which contours ray 44 exits head 40. This is accomplished by using the geometry which results from an XZ planar plot as shown in FIG. 9. In this case, the intercept between ray 44 and the line segments connecting XaZa, XbZb and XcZc is solved in the same manner as for the intercept between ray 44 and the various head contour coordinates shown in FIG. 8. Thus, (see FIG. 4A) the equation for ray 44 in the XZ plane has substituted therein the coordinate values for each of the contour points shown in FIG. 9 (box 180). The sign change, derived as aforementioned, occurs in subsequent solutions to the XZ line equation for ray 44, and determines that ray 44 intersects line 50 segment between contour coordinates XbZb and XcZc. Subsequently, the equation for line segment 50 is derived (box 182) and solved for the intersection between the XZ line equation for ray 44 and the equation for line 50. In this manner, the XiZi coordinates of the intercept point between ray 44 and line 50 are determined (box 184). Next, the Yi coordinate of the intercept point is determined using the fact that the value of the Yi coordinate bears the same proportionality ratio as does the Xi coordinate between interception points XbYbZb and XcYcZc on the b and c contours Thus, knowing the intercept point between ray 44 and line 50 (FIG. 10) allows the determination of the value of Yi (box 186).

Subsequently, the program determines whether all of the hat coordinate points have been selected and the intercept points between head 40 and rays drawn to each of the hat coordinate points determined. If not, the program cycles back to box 160 in FIG. 3A and repeats itself (decision box 190). If however, all of the hat coordinate points have been selected and the aforementioned functions determined, the program proceeds to solve for the function $di^2$ for each coordinate point by solving equation 1 set forth above (box 192). Then, the mean is determined for all values of $di^2$ as found (box 194) as an indication of the quality of the fit of the hat over the head.

Subsequently, succeeding values of the mean are compared (box 196) to determine whether the function has decreased in value over the last determination. (decision box 198) If the value of the mean has, in fact, decreased indicating that the fit is improving, the program cycles back to box 156 in FIG. 3A and the variation subroutine continues until decision box 198 determines that succeeding means are not improving the fit. At this point, the program stops and indicates that the data from the various radiologic scans now is in optimum registration.

Now, the operator is able to select radiologic slices of interest from one scan and to superimpose thereover radiologic data from another scan to provide composite information in optimum registration. Thus once the transformation between scans has been determined, information is transferred between scans in several ways. Volumes of interest are outlined on multiple slices in one scan; a solid model constructed from these contours is then transformed to the coordinate system of the other scan and sectioned along its planes. This produces contours which may be directly overlaid on the second scan. By this means a tumor region which is well visualized in MRI images may be mapped accurately into CAT slices for radiotherapy planning. It may also be desirable to produce oblique sections through the image data of one scan along the planes of the other, producing for example CAT and/or MRI slices which correspond exactly to the planes of a PET scan. Such slices may be viewed side by side, or overlaid in either monochrome or color. It is often useful to produce sagittal, coronal or oblique sections through one scan, and corresponding sections through the other. In this way the distribution of PET activity on sagittal or coronal CAT or MRI sections may be visualized. Volumes of interest defined in one scan may also be sectioned along sagittal, coronal or oblique planes through another. Additionally, CAT scan slices taken at other times can be superimposed, one over the other, to determine if swelling or other anomalies in succeeding scans have modified over the period of time between the scans.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for creating a composite image from disparate sets of tomographic image slices, the method comprising:

creating a "head" from one set of tomographic image slices, said head comprising a three dimensional stack of contours of said one set of slices;

creating a "hat" from another set of said tomographic image slices, said hat comprising a plurality of points with coordinate positions which define a three dimensional surface of a stack of said image slices;

superimposing said hat on said head;

determining from side and top planar views of said hat and head, a function which defines the mean distance of said hat points from said head contours; and adjusting the relative position of said hat on said head until said function is found to be a minimum.

2. The invention as defined in claim 1 further including the step of:

normalizing the coordinates of points making up said hat and contours of said head slices by converting their X, Y and Z pixel coordinates to distance measures along their respective X, Y and Z axes.

3. The invention as defined in claim 2 further including the step of:

correcting said image slice coordinates if a gantry used to create said slices was not aligned orthogonally to a patient's longitudinal axis when said slices were created.

4. The invention as defined in claim 3 wherein said hat and head are created by examination of the tomographic slices, conversion of each said slice into a set of spatial coordinates, and a reduction of said set of coordinates by elimination of more than 50% thereof.

5. The invention as defined in claim 1 wherein said determining step includes the following steps:

creating a ray from the centroid of said head to each hat point in both said side and top planar views;

finding the point of intersection of said ray with said head contours from said top planar view; and finding between which two contour planes said ray exits said head from said side planar view.

6. The invention as defined in claim 5 wherein said determining step comprises:

finding a function $d_i^2$ indicative of the distance of a hat point having the cartesian coordinates X, Y and Z from an intersection point between a said ray and said head contour having the cartesian coordinates $X_i$, $Y_i$ and $Z_i$, where $d_i^2 = (X-X_i)^2 + (Y-Y_i)^2 + (Z-Z_i)^2$.

7. The invention of claim 6 further including the step of:

combining all said functions $d_i^2$ to arrive at an indication of the fit of said hat on said head.

8. The invention of claim 7 wherein said indication is the mean average of all said functions and equals $$\sum^N d_i^2$$

where N equals the number of hat points.